Dec. 28, 1926.

H. KAUFFMAN

MOTOR DRIVEN PLOW

Filed August 27, 1920

Patented Dec. 28, 1926.

1,612,379

UNITED STATES PATENT OFFICE.

HANS KAUFFMAN, OF MUNICH, GERMANY.

MOTOR-DRIVEN PLOW.

Application filed August 27, 1920, Serial No. 406,512, and in Germany September 6, 1917.

The invention relates to a motor driven plow.

Heretofore two types of motor driven plows have been constructed, viz, first, the so-called hauling plows consisting of a four-wheeled traction engine with multiple plow elements either attached to the frame of the traction engine or hauled by the traction engine; and second, the three-wheeled motor plow with front driving wheels and a rear steering wheel, the motor being arranged in front of the driving wheels and the plow elements being rigidly connected with the frame of the motor.

The present invention is a combination of both types of motor plows and is particularly adapted for small motor driven plows, and consists in the specific suspension and guiding means of the plow element or elements, and to the connection thereof with the main frame of the plow elements in such a manner that the improved motor driven plow acts exactly like a tractor plow with two running or guide wheels, the driving wheels of the tractor serving at the same time as running wheels or guide wheels for the plow.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit of the invention or sacrificing any of the advantages thereof.

Figure 1:
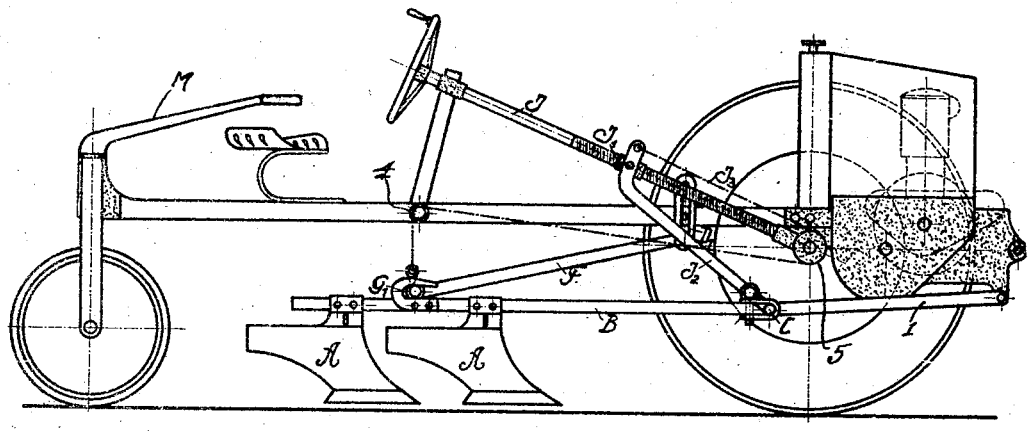
Fig. 1 is a side elevation of a motor driven plow constructed in accordance with this invention.
Figure 2:
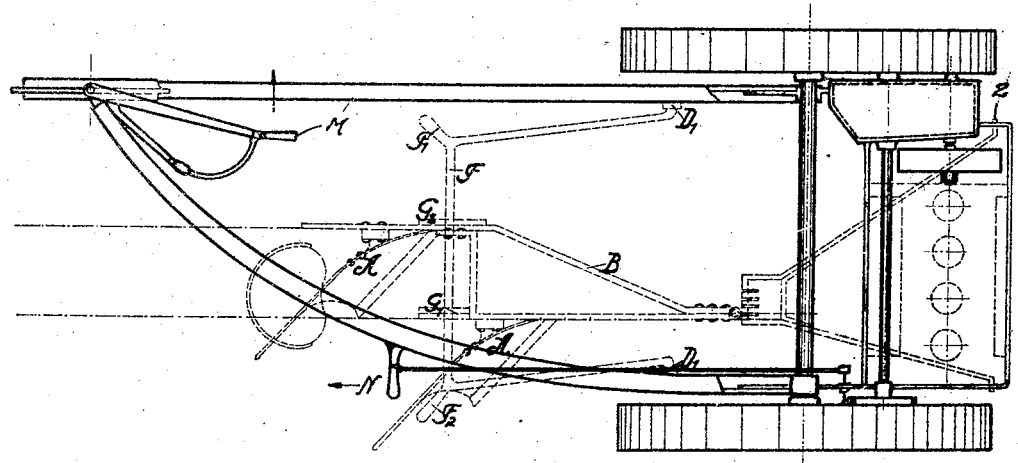
Fig. 2 is a plan view of the same.

The depth at which the plow elements A penetrate the ground is determined by the vertical adjustment of the draw bar B which is connected at its front end by a universal joint C with a front pivoted hanger frame 1, the universal joint permitting the draw bar with its plow elements to swing either laterally or vertically to clear stones and other obstructions and for various other purposes such as raising the plow clear of the ground when transporting the motor driven plow from one point or place to another. The front hanger frame is approximately V-shaped, being composed of rearwardly converging sides connected together at their rear ends and provided at their front ends with laterally extending transverse pivots 2 which are mounted in suitable bearings carried by the main frame of the motor driven plow. By this construction the front hanger frame is adapted to be swung upwardly or downwardly to raise or lower the front end of the draw bar which is connected by the said universal joint with the front hanger frame. The front end of the draw bar is adapted to be adjusted in a vertical direction from the driver's seat by the nuts hereinafter described, and the plow elements are maintained in their vertical adjustment by the said means for causing them to maintain a uniform depth. The rear portion of the draw bar is connected by a rear pivoted hanger frame F which is approximately U-shaped, being composed of spaced sides and a rear transverse connecting portion, the sides being pivoted at their front ends at $D^1$. The pivots of the rear hanger frame are arranged transversely and permit the said rear hanger frame to swing upwardly and downwardly. The transverse connecting portion of the rear pivoted frame is arranged in spaced slots $G^1$ and $G^2$ preferably formed by hooks secured to and carried by the draw bar. The rear pivoted hanger frame is of sufficient size to provide ample lateral movement for permitting the turning of the motor driven plow without removing the plow elements from the ground. The universal joint at the front end of the draw bar and the slidable connection between the rear portion of the draw bar and the rear pivoted frame permit a relative lateral movement of the rear hanger frame and the draw bar necessary for guiding and turning the plow. In order to enable the transverse portion of the rear pivoted hanger frame to remain in a horizontal position or in substantial parallelism with the surface of the ground if, for example the right-hand wheel runs in a furrow and the shaft or axle is slightly inclined, one of the pivots of the rear transverse hanger frame adjusts itself vertically in a vertical bearing slot 3 provided at each side of the motor driven plow.

The front of the draw bar and the rear portion of the front hanger frame are adjusted vertically by mechanism comprising a longitudinally disposed shaft or spindle I arranged at an inclination and having a lower threaded portion on which is mounted a nut I¹ and a connecting rod I². The connecting rod which is arranged at an inclination is pivotally connected at its upper end to the nut and at its lower end to the front end of the draw bar and it is adapted to be adjusted by the nut and the threaded shaft to raise and lower the front end of the draw bar and it also holds the front end of the draw bar against vertical movement after the same has been adjusted.

In order to enable the draw bar and the plow elements to be lifted entirely clear of the ground for permitting the motor driven plow to make a short turn or to be moved from one place to another, a flexible connection I³ such as a rope or chain is employed. The flexible connection I³ extends longitudinally of the motor driven plow and its rear end is connected to the rear portion of the rear transverse portion of the rear hanger frame F. The flexible connection extends upwardly from the rear portion of the draw bar to a rear pulley 4 and passes over the same, and it then extends forwardly to the lower end of the adjusting shaft or screw I and passes partially around a front guide pulley 5 and then upwardly at an inclination to the upper end of the connecting bar I² which projects above the adjusting screw or shaft I, as clearly illustrated in Fig. 1 of the drawing. The rear portion of the draw bar is suspended from the rear pulley 4 and when the nut is moved longitudinally of the threaded shaft or spindle I, the front and rear portions of the draw bar are simultaneously and uniformly raised or lowered without interfering with the vertical and lateral movement of the plow elements.

The seat for the accommodation of the driver is preferably arranged in rear of and above the plow elements, and at the side of the steering lever M so that the steering lever can be operated with the left hand and the shaft or spindle operated with the right hand, for raising or lowering the plow elements. The rear hanger frame is provided at the ends of its rear transverse portion with pedals F¹ and F² operated to control the plows according to requirements.

What is claimed is:

1. A motor plow comprising a tractor, front and rear hanger frames pivotally connected with the tractor and arranged to swing upwardly and downwardly, a draw bar having a plow element connected at its front and rear portions with the hanger frames movable upwardly and downwardly with the same, and adjusting mechanism for raising and lowering the draw bar, said adjusting mechanism comprising a flexible connection extending to the rear portion of the draw bar and a connecting bar extending to the front portion of the draw bar.

2. A motor plow comprising a tractor, front and rear hanger frames pivotally connected with the tractor and arranged to swing upwardly and downwardly, a draw bar having a plow element connected at its front and rear portions with the hanger frames movable upwardly and downwardly with the same, and adjusting mechanism for the draw bar comprising a threaded shaft, a nut mounted on and actuated by the shaft, and a connecting bar extending from the nut to the draw bar.

3. A motor plow comprising a tractor, front and rear hanger frames pivotally connected with the tractor and arranged to swing upwardly and downwardly, a draw bar having a plow element connected at its front and rear portions with the hanger frames movable upwardly and downwardly with the same, and adjusting mechanism for the draw bar comprising a threaded shaft, a nut mounted on and actuated by the shaft, a connecting bar extending from the nut to the front portion of the draw bar, a flexible connection actuated by the nut and extending to the rear portion of the draw bar, and guiding means for the flexible connection whereby the rear portion of the draw bar will be raised and lowered simultaneously with the front portion.

4. A motor plow comprising a tractor, front and rear pivoted hanger frames carried by the tractor and arranged to swing upwardly and downwardly, a draw bar slidably connected with the rear hanger frame for relative lateral movement, a universal joint connecting the draw bar with the front hanger frame, a plow element carried by the draw bar, and adjusting mechanism for raising and lowering the draw bar.

5. A motor plow comprising a tractor, front and rear pivoted hanger frames arranged to swing upwardly and downwardly, the rear hanger frame being composed of spaced sides and a transverse connecting portion, a draw bar having spaced slots at its rear portion receiving the transverse connecting portion of the rear hanger frame, a universal joint connecting the draw bar with the front hanger frame, a plow element carried by the draw bar, and adjusting mechanism connected with the front end of the draw bar for raising and lowering the same.

In testimony whereof I affix my signature.

HANS KAUFFMAN.